United States Patent

Hansen

[15] 3,667,048

[45] May 30, 1972

[54] CARRIER SUPPLY WITH SYNCHRONOUS REDUNDANCY

[72] Inventor: Kjell T. Hansen, Mountain View, Calif.

[73] Assignee: Farinon Electric, San Carlos, Calif.

[22] Filed: Nov. 13, 1970

[21] Appl. No.: 89,240

[52] U.S. Cl. ..............................325/157, 178/69.5 R, 325/2, 325/184, 331/18, 331/25, 331/55

[51] Int. Cl. ..............................H04b 1/02, H04j 1/06

[58] Field of Search ..............................325/2, 144, 152, 156, 157, 325/184, 187; 331/18, 25, 55; 178/69.5 R; 179/15 FD

[56] References Cited

UNITED STATES PATENTS

| | | | |
|---|---|---|---|
| 2,840,696 | 6/1958 | Beck et al. | 325/156 |
| 2,905,813 | 9/1959 | Protze | 325/157 |
| 3,363,181 | 1/1968 | Haywood et al. | 325/2 |
| 3,370,251 | 2/1968 | Overstreet | 331/55 |

*Primary Examiner*—Benedict V. Safourek
*Assistant Examiner*—Peter M. Pecori
*Attorney*—Flehr, Hohbach, Test, Albritton & Herbert

[57] ABSTRACT

A redundant carrier supply which includes a pair of parallel channels each of which receives a base frequency from an associated crystal controlled oscillator and provides output pulses of high harmonic content which are linearly added and which are maintained without phase and amplitude interruptions if either channel fails. Each of said channels includes frequency dividers, pulse generators and attenuator networks. A sync control circuit is connected between the channels for maintaining the operation of the oscillators in synchronism, phase control circuits are connected between the channels for maintaining the signals in the channels in phase, and attenuator circuits are provided in each channel for maintaining the output constant in the event of failure in either channel.

14 Claims, 7 Drawing Figures

INVENTOR
KJELL T. HANSEN

BY

Flehr, Hohbach, Test, Albritton & Herbert
ATTORNEYS

INVENTOR.
KJELL T. HANSEN

BY Flehr, Hohbach, Test, Albritton & Herbert
ATTORNEYS

INVENTOR.
KJELL T. HANSEN
BY Flehr, Hohbach, Test, Albritton & Herbert
ATTORNEYS

INVENTOR.
KJELL T. HANSEN

BY Flehr, Hohbach, Test, Albritton & Herbert

ATTORNEYS

INVENTOR.
KJELL T. HANSEN

BY

Fleher, Hohbach, Test, Albritton & Herbert
ATTORNEYS

INVENTOR
KJELL T. HANSEN
BY
Flehr, Hohbach, Test, Albritton & Herbert
ATTORNEYS

INVENTOR
KJELL T. HANSEN
BY Flehr, Hohbach, Test Albritton & Herbert
ATTORNEYS

CARRIER SUPPLY WITH SYNCHRONOUS REDUNDANCY

BACKGROUND OF THE INVENTION

This invention relates generally to a carrier supply and more particularly to a two-channel redundant carrier supply which provides output signals without phase and amplitude interruptions in the event of failure in either channel.

In data and voice radio communication systems and more particularly in frequency division multiplex radio communication systems, it is necessary to provide a plurality of subcarriers which are harmonics of the reference carrier or signal. For continuous communication, the carriers should be provided regardless of failure of electrical components in the carrier supply system. To this end, it has been the practice to provide a primary carrier supply which supplies the necessary carrier and a standby supply to which the output is connected in the event of failure of the primary supply. The drawback with present systems is that amplitude and phase interruptions are associated with the transfer to the standby supply. This has been tolerated in voice communication systems. In data communication systems, such interruptions can cause the loss of data and disruption of associated computers and the like.

OBJECTS AND SUMMARY OF THE INVENTION

It is an object of the present invention to provide an improved redundant carrier frequency supply for use in connection with voice and data communication systems.

It is another object of the present invention to provide a redundant carrier supply system which includes a pair of channels whose outputs are linearly combined to provide the output signal and which include means for maintaining the channel signals in synchronism and phase and which provide a substantially constant output signal regardless of whether both channels are operative or only one channel is operative.

The foregoing and other objects of the invention are achieved by a carrier frequency supply including first and second parallel channels each including a pulse generator and a signal controlled attenuator means connected to receive the output of said generators, detecting means connected between said channels and providing an output control signal when one of said channels is not operating properly and applying said signal to said attenuating means of each channel to mute the output of one channel and increase the output of the other channel to maintain substantially constant output signals. The detecting means may also maintain the phase between the two generators. Said carrier supply may also include oscillator means for providing base frequencies to each of said channels with means connected to the channels to synchronize the operation of the two oscillators.

DESCRIPTION OF THE PREFERRED EMBODIMENT

GENERAL DESCRIPTION

Figure 1:
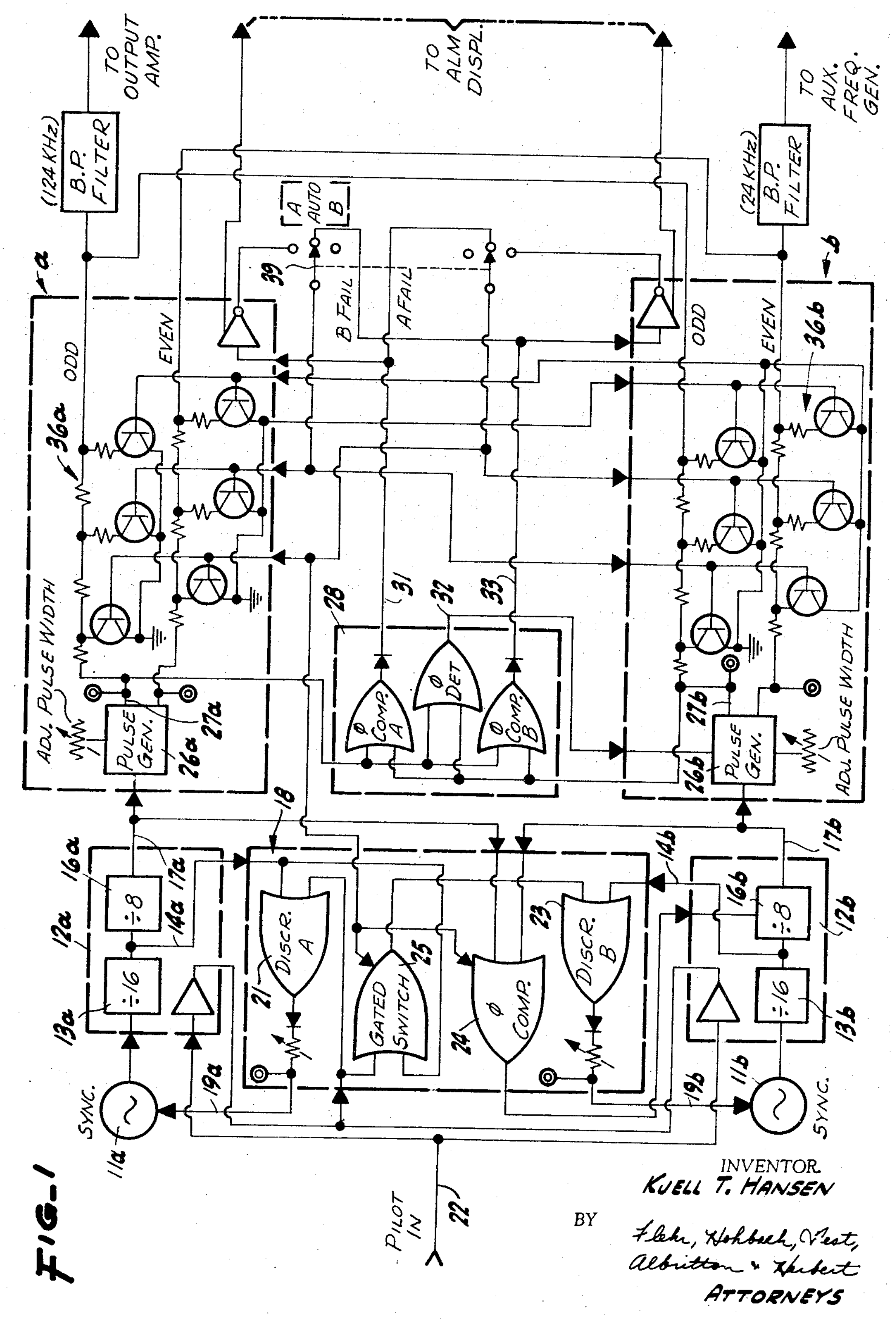
FIG. 1 is a schematic block diagram of a carrier supply in accordance with the invention.

The carrier frequency supply includes a pair of parallel channels, *a* and *b*, each of which receives a base frequency from an associated crystal controlled oscillator, divider networks which receive the base signal and reduce the frequency, pulse generating means responsive to the reduced frequency for generating output pulses of high harmonic content from which the carrier frequencies are derived, and attenuating means for controlling the output amplitude from the pulse generating means. A synchronizing means receives signals from the two channels and during normal operation maintains the oscillators in synchronism with each other and with the pilot input. Phase control means cooperate between the channels to keep the signals in the channels in phase during normal operation. Controlled attenuators are included in each channel. The attenuators operate responsive to failure of either channel to provide an output from the operating channel equal to the combined output of the two channels and to mute the inoperative channel.

More particularly, the carrier frequency supply includes first and second highly stable crystal controlled master oscillators 11*a* and 11*b*. By way of example, the oscillators 11*a* and 11*b* may generate a basic clock frequency of 1.024 MHz. Each of the oscillators drives a divider network 12*a*, 12*b*, respectively, which includes a first divider 13*a*, 13*b*, respectively. In the present example, the first dividers divide by 16 and supply output signals having a frequency of 64 KHz at lines 14*a* and 14*b*. The dividers 13*a*, 13*b* are followed by second dividers 16*a*, 16*b*, which, in the present example, divide by eight providing an output signal having a frequency of 8 KHz at the lines 17*a*, 17*b*. The dividers 12*a*, 12*b* are of conventional design and are herein not described further.

An oscillator synchronizing control circuit 18 is associated with the two oscillators and frequency dividers. The sync control circuit, to be presently described in detail, provides a synchronizing d.c. control voltage to each of the master oscillators 11*a*, 11*b* along the lines 19*a* 19*b*. The sync control includes a first discriminator 21 which synchronizes the master oscillator 11*a* with the incoming sync pilot applied at line 22 and a second discriminator 23 which normally synchronizes the master oscillator 11*b* with master oscillator 11*a*. Discriminator 21 receives and compares the signal from the divider 13*a* with the incoming synchronizing pilot and generates a d.c. control voltage which is linearly proportional to the phase shift between the two input signals. This voltage is fed to a voltage controlled capacitor (not shown) in the master oscillator 11*a* locking it in phase with the pilot signal. Discriminator 23 receives the signal from the divider 13*b* and compares it with the signal from the divider 13*a* to produce an output d.c. voltage proportional to the phase shift between the output signals from dividers 13*a* and 13*b*. This voltage is fed to master oscillator 11*b* locking it in phase with oscillator 11*a*. As a result, there is always zero phase shift between the oscillator 11*a* and 11*b* regardless of the presence or absence of the pilot.

As previously described, the output of the dividers 13*a*, 13*b* is fed to dividers 16*a*, 16*b* to produce output signals of predetermined frequency at the lines 17*a*, 17*b*. The dividers consist of cascade flip-flops; thus, the output signals on the lines 17*a*, 17*b* may not necessarily be in phase. To ensure inphase conditions at this point, the two signals on lines 17*a*, 17*b* are compared in another phase comparator 24 which produces output pulses having pulse width proportional to the phase difference. These pulses are differentiated and fed to divider 16*b* to reset the divider. As a result, when the system is started or recovers from a failure and the outputs along the lines 17*a* and 17*b* are not in phase, the reset pulses will continue to reset the divider 16*b* until divider 16*a* catches up and the two signals are fully phase locked.

The phase locked signals at the lines 17*a*, 17*b* are fed to two pulse generators 26*a* and 26*b*, to be presently described in detail. The output from the pulse generators 26*a*, 26*b* are a bipolar pulse train with alternately positive and negative going pulses rich in odd harmonics of the driving frequency and a unipolar pulse train rich in even harmonics of the driving frequency. The pulse generators include flip-flops and, therefore, there is a possibility that the phase relationship between the even and odd harmonic pulse trains in one of the pulse generators 26*a*, 26*b* may be out of phase with those of the other. Consequently, real time monitoring and phase correction is required. The bipolar pulse trains appearing at the output lines 27*a*, 27*b* are fed to a digital phase comparator 28 which includes three outputs 31, 32 and 33. Under normal operating conditions, with both pulse trains present and in phase, there is no output at any of the three outputs. If both pulse trains are present but 180° out of phase, a reset pulse will be present at the output 32 and this is fed to a flip-flop in the pulse generator **26*b* resetting it so that both pulse trains are again in phase. In the event that the pulse train on the line 27*a* is missing due to some component failure at this point, there will be a fail d.c. voltage present at the output 31. If the pulse train of output at 27*b* is not present, there will be a fail signal output at the line 33**.

The d.c. fail voltages developed in the comparator 28 are used to control a string of transistor switches designated generally at **36*a*, 36*b* in the two pulse generators which, in turn, control attenuators, as will be presently described. The fail signal on the line 31 will mute both the odd and even harmonic buss from the pulse generator 26*a* and at the same time remove a pad from the two busses on pulse generator 26*b* to maintain the combined output at constant amplitude. Conversely, a fail signal on the line 33 will mute both busses out of the pulse generator 26*b* and remove a pad from the busses from the pulse generator 26*a*** to maintain the combined output at constant amplitude. In this way, an uninterrupted signal of constant amplitude is maintained at the junction point where the two odd and the two even harmonic busses are linearly added and fed to their respective associated filters.

To allow removal of one of the pulse generators without upsetting the impedance match at the junction point, a terminating interlock is included at the output of each buss of each pulse generator. This consists of a transistor switch normally held off through a ground connection on the opposite pulse generator board. Removal of the board turns the switch on placing a terminating resistor across the output of the remaining pulse generator equal to the load presented by the removal generator at the same time the pad is removed.

A fail signal in channel "*a*" appearing at 31 is fed back to gated switch 25 in circuit 18. The switch 25 transfers the incoming synchronizing pilot to discriminator 23 and disconnects the signal from the divider **13*a*, thus phase locking the master oscillator 11*b*** to the pilot when there is a failure in channel *a*.

In the comparator circuit 28, the channel *a* fail signals inhibit the comparator from producing channel "*b* " reset pulses.

For test and maintenance purposes, either channel can be operated by operation of a front panel switch 39. Turning the switch to channel *a* will feed a mute signal to the output of pulse generator **26*b* and a pad control signal to pulse generator 26*a***. Conversely, turning the switch to channel *b* will mute the output of pulse generator **26*a* and remove the pad from pulse generator 26*b***. The switch d.c. control signals are obtained from inverting amplifiers on the respective generator boards and prevent switching a channel off if it is the only one in operation.

The odd harmonic pulse train may be fed to a 124 KHz filter and thereafter amplified in a pair of redundant line amplifiers. The even harmonic pulse train may be fed to a 24 KHz bandpass filter which feeds another pair of redundant pulse generators of the type just described with reference to **26*a*, 26*b*** and the associated attenuator switches.

OSCILLATOR SYNC CONTROL

Figure 2A:
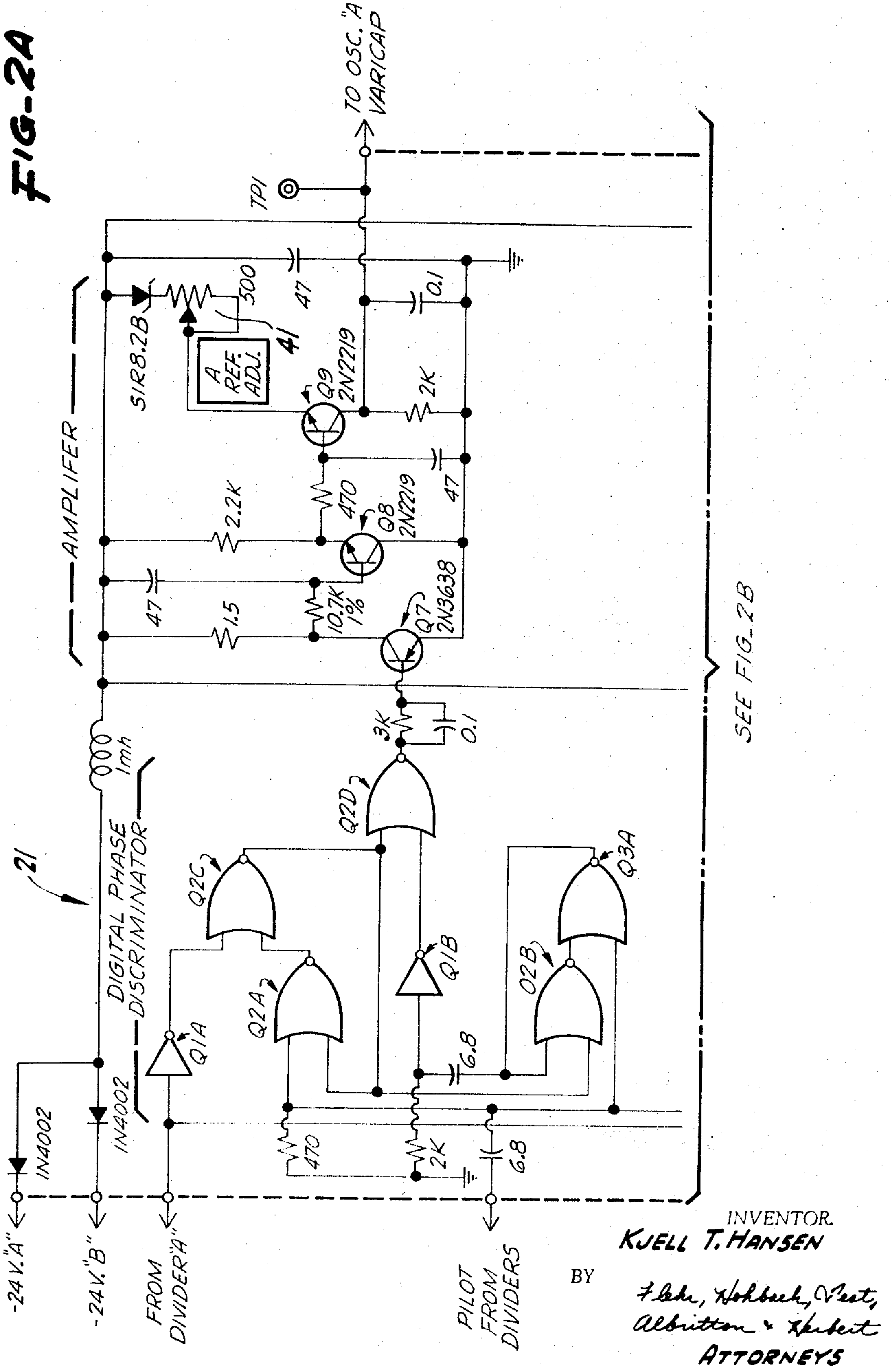
FIGS. 2A, B and C are detailed schematic diagrams of the oscillator sync control of FIG. 1.
Figure 2B:
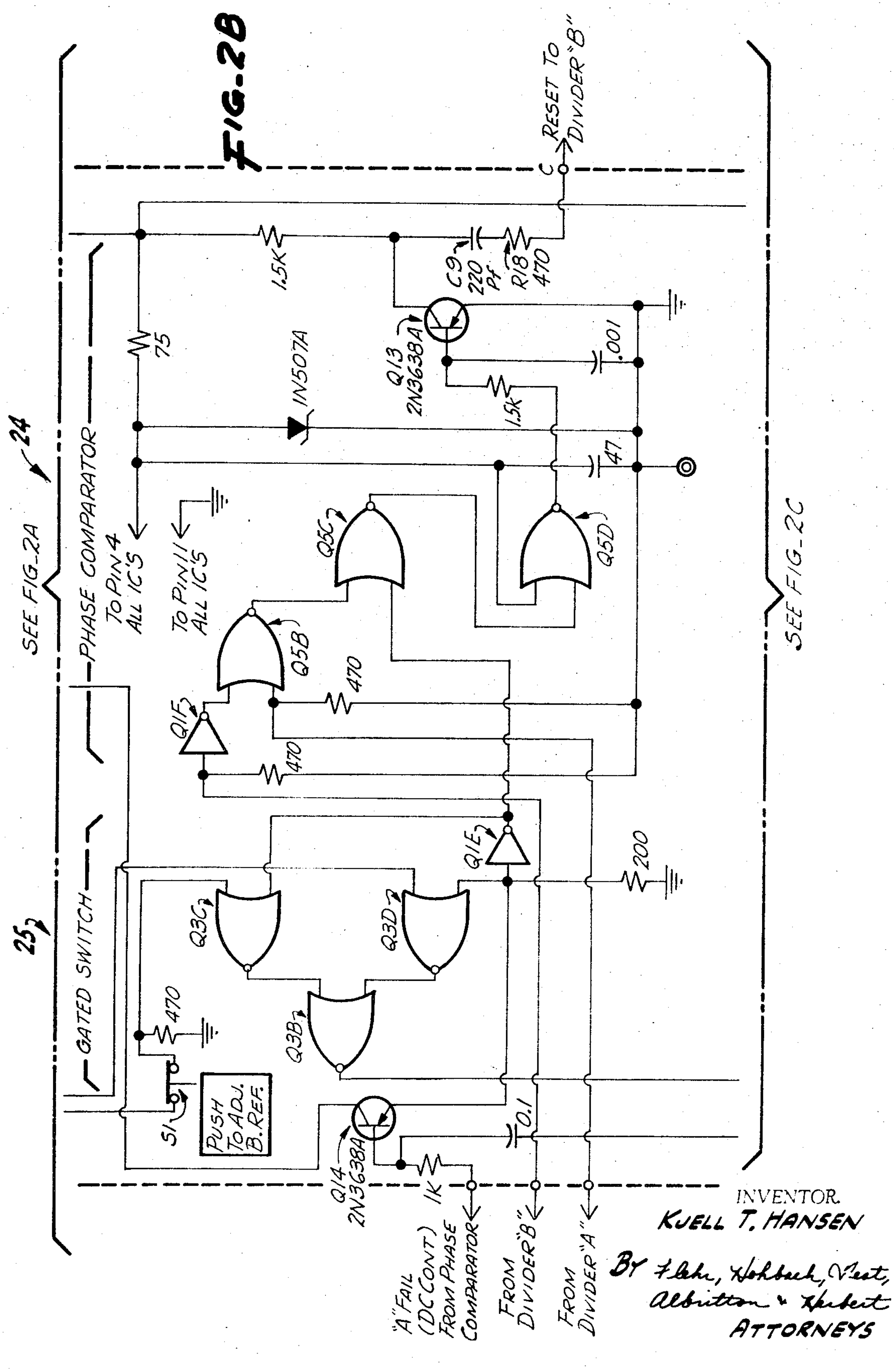
Figure 2C:
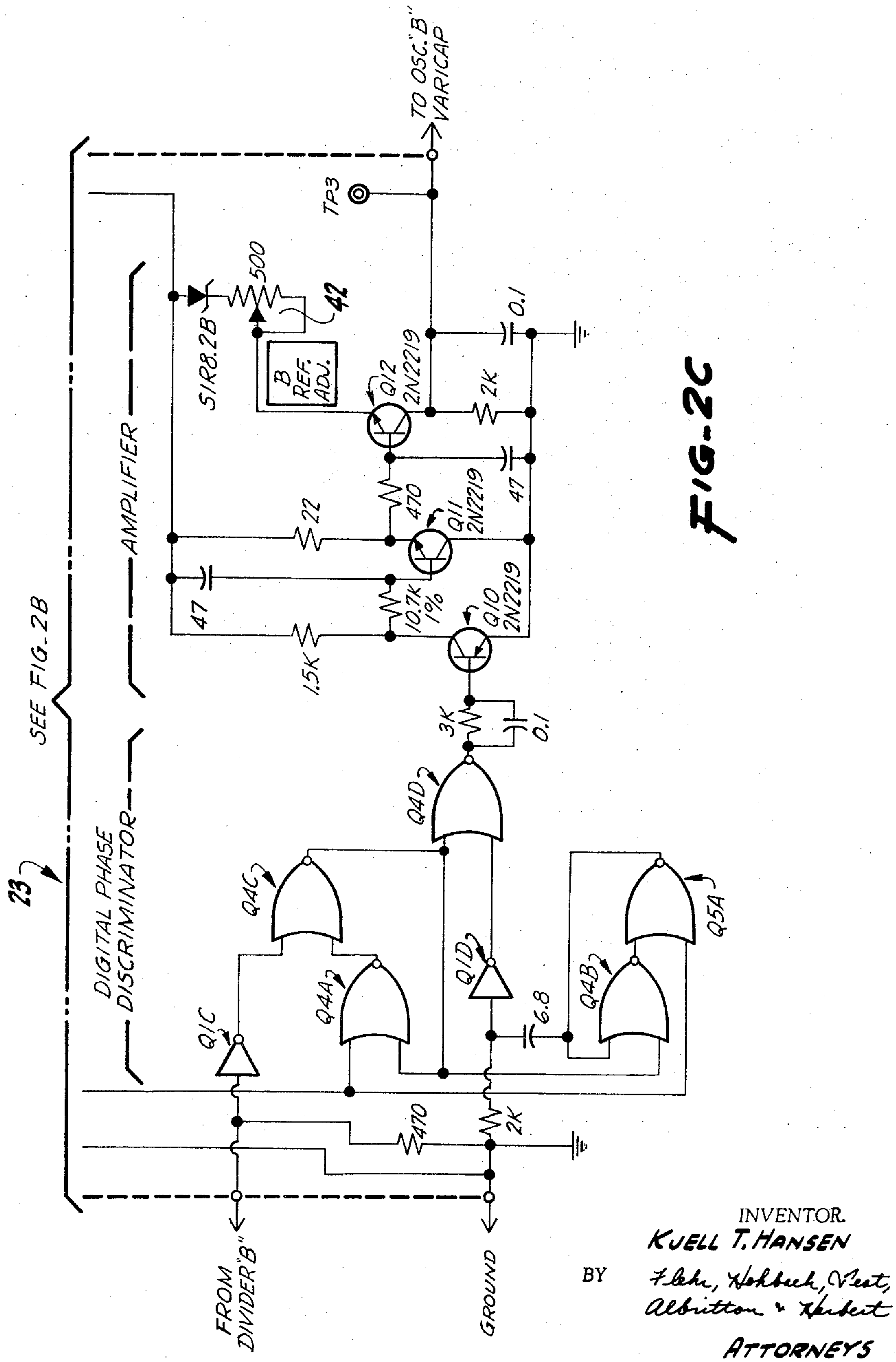

The discriminator 21, FIG. 1, which accepts the signal from the divider **13*a* and the pilot, line 22, is shown in more detail in FIG. 2. The discriminator contains five NOR gates Q2A, Q2B, Q2C, Q2D and Q3A, and two inverters Q1A and Q1B. When the two squarewave inputs are exactly in phase, or only one input is present, the comparator output to the base of Q7 is a squarewave. The transistor Q7 and its associated components form an integrating circuit, which produces a d.c. output (nominally −10 volts). Emitter-follower Q8 and its associated components adjust the impedance of the d.c. signal and apply it to the transistor Q9 which, together with its associated components, form an amplifier. The nominal output signal level to the oscillator 11*a* is adjusted by means of a reference adjust potentiometer 41** in the emitter circuit of the transistor Q9.

If the pilot and the divided signal are not in phase, the comparator output will not be symmetrical; i.e., the pulses will be elongated or narrowed depending upon whether the input from divider **13*a* leads or lags the pilot input. Integration then results in a d.c. voltage at the input of Q8 proportional to the phase shift from zero volts at 180° lead to −20 volts at 180° lag and −10 volts at 0° phase shift for the circuit shown. Output amplifier Q9 responds to very small changes in input producing a d.c. control voltage for the oscillator that ranges from 0 to −10 volts over a phase shift range from −30° to +30° at 64 KHz. Typically, the master oscillator 11a** will be synchronized to the pilot frequency within ¼° to ½°.

The discriminator 23 shown in the lower portion of the figure operates in a manner substantially identical to that just described except that its inputs are the signals from divider **13*b* and gated switch 25. The output from the gated switch is normally the signal from divider 13*a*. The discriminator includes five NOR gates Q4A, Q4B, Q4C, Q4D Q5A, and two inverters Q1C and Q1D. The output of the comparator is applied to the integrating circuit including transistor Q1O and its associated component, thence to the emitter-follower including the transistor Q11 and its associated components and to the emitterfollower including the transistor Q12. Reference adjust 42 controls the signal level of the control voltage for oscillator 11*b***.

As previously described, if master oscillator **11*a* fails, master oscillator 11*b* is synchronized with the pilot input instead of with the divider 13*a*. This is accomplished by means of a gated switch 25, FIGS. 1 and 2B, which has the input from divider 13*a* to NOR gate Q3C and a pilot input at NOR gate Q3D. The switch is controlled by a fail signal from the comparator 28 on line 31, FIG. 1, applied through inverter Q1E to Q3C. The normal fail input inhibits output from Q3D so that the divider 13a signal is forwarded through Q3C and Q3B to the discriminator 23. When a fail signal exists, a negative voltage, after inversion, inhibits output from Q3C. The pilot signal is then forwarded through Q3D and Q3B to the discriminator 23**.

The divider phase comparator 24, FIG. 2, which compares the phase of the output from dividers **12*a* and 12*b* receives the signals from each of these dividers. Because the frequency dividers contain cascade flip-flops, the two outputs may not be necessarily in step when the system is started. If they are not in step, the comparator sends reset pulses to the frequency divider 16*b*** which resets the flip-flops back to zero until the phase of channel *a* catches up and the two circuits are synchronized. The signal from the frequency divider **16*b* is inverted by inverter Q1F to provide one input to NOR gate Q5B whose other input is the signal from frequency divider 16*a***. Normally, there will be no pulse output from Q5B. When an out out of phase condition exists, the resultant pulses will be relayed by NOR gates Q5C and Q5D to the base of switching transistor Q13. Each pulse turns off Q13 momentarily permitting a negative d.c. reset pulse to be transmitted through C9 and R18 to pin C in the divider. The channel *a* fail input, line 31, inverted by Q1E, is also applied to Q5C and prevents reset pulse transmission when the channel *a* equipment is not in service.

PULSE GENERATORS AND ATTENUATORS

Figure 3A:
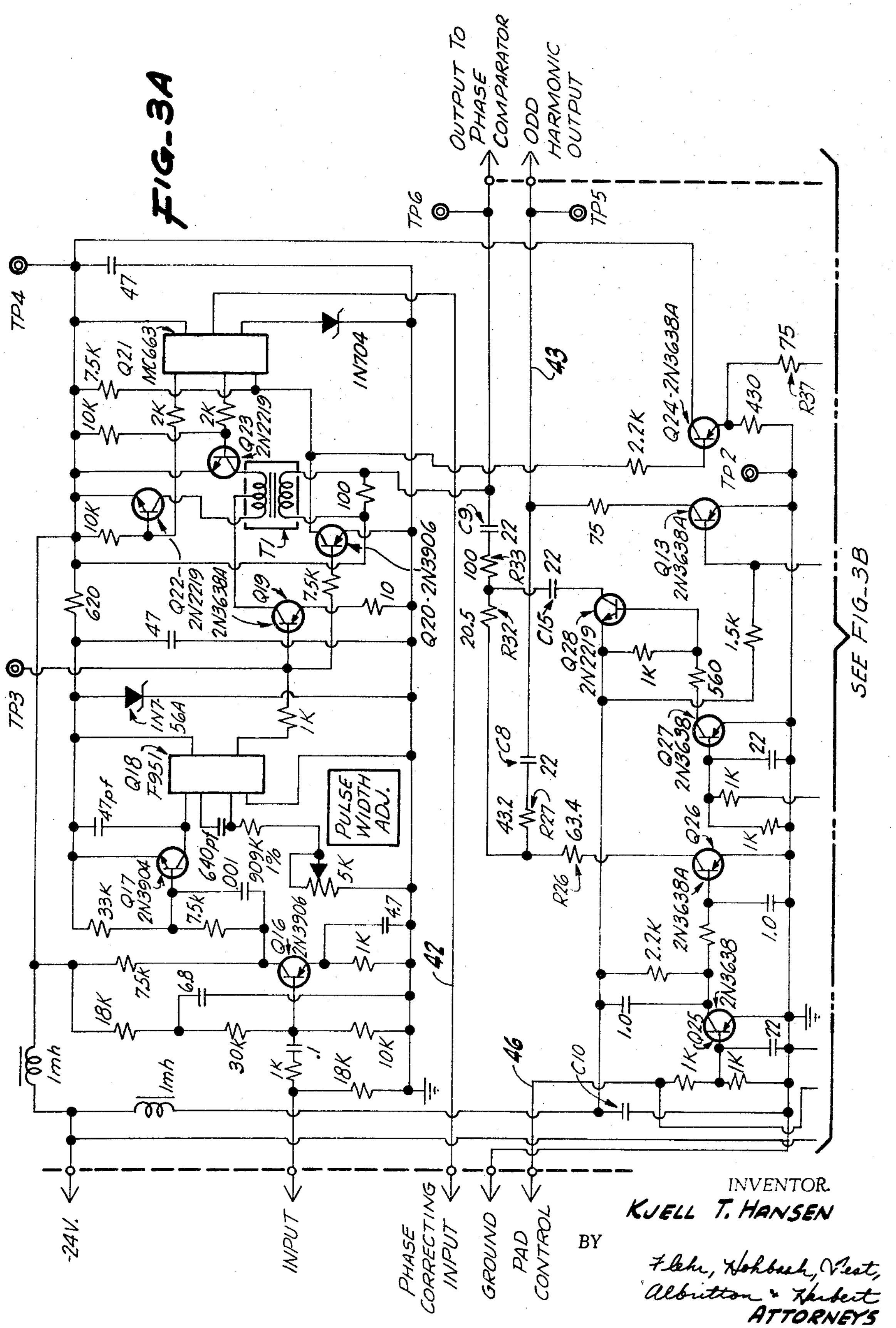
FIGS. 3A and B are detailed circuit diagrams of the pulse generator of FIG. 1.
Figure 3B:
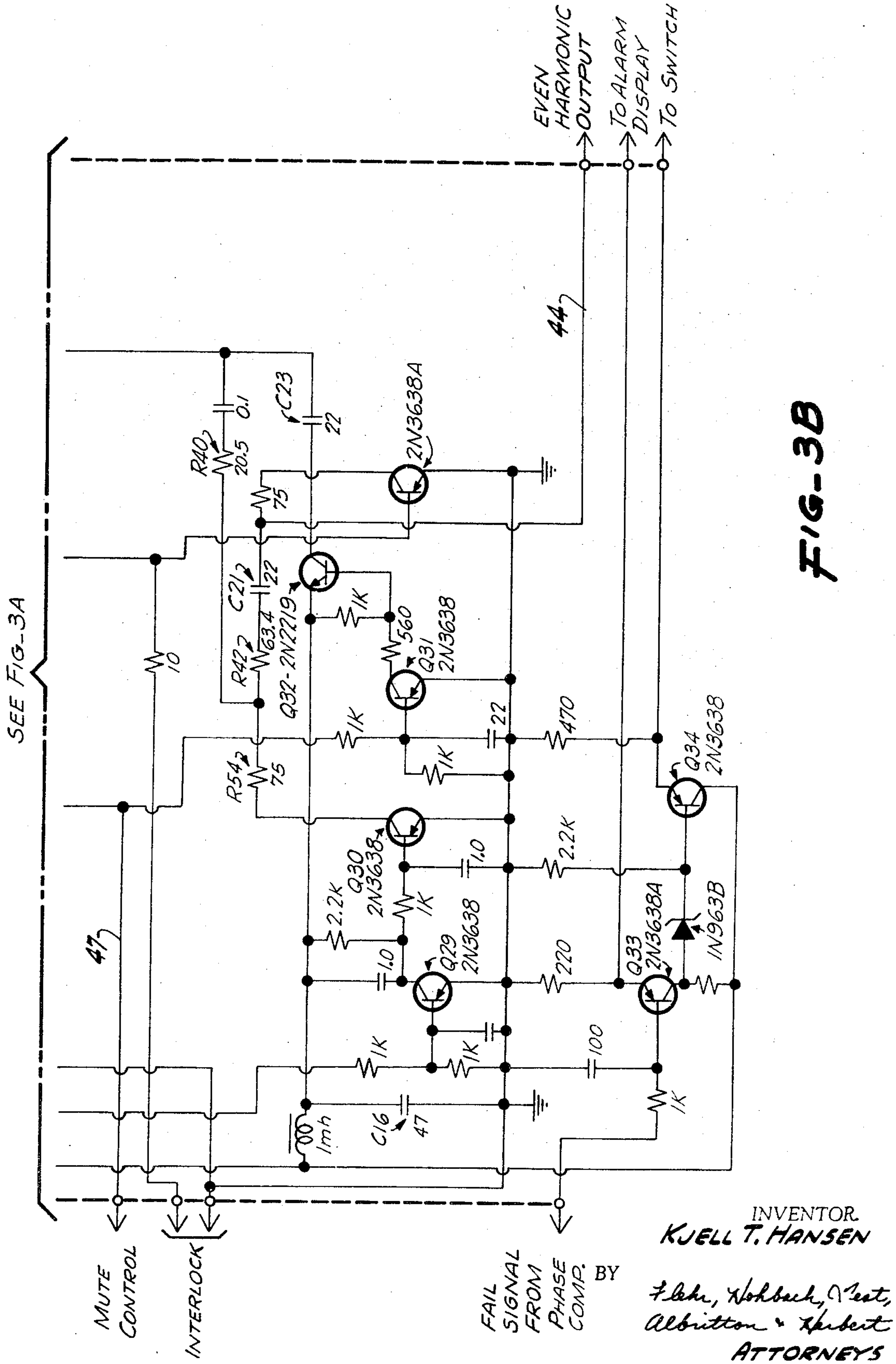

The pulse generator circuits **27*a* and associated switching circuits 36*a*, shown in FIG. 1, are shown in more detail in FIG. 3. The pulse generator circuits 27*b* and switching circuits 36*b* are identical and consequently are not shown. The output from the frequency divider 12*a* is applied to a trigger circuit comprising the transistors Q16 and Q17 and associated components which differentiate the input signal to drive a one-shot pulse generator Q18. The output from the one-shot is a train of narrow unipolar pulses at the input rate of frequency. The pulses are applied through Q19 to the primary center tap of a transformer T1, and also through a flip-flop driver Q20 to integrated flip-flop circuit Q21. Q21 controls switching transistors Q22 and Q23 causing them to conduct alternately. When Q22 conducts, the pulses flow in one direction in the primary of T1 and when Q23 conducts, they go in the opposite direction. The resulting signal in the secondary winding of the transformer T1 is a bipolar pulse train. The pulse phase comparator 28, FIG. 1**, monitors the bipolar output from the pulse generator and the pulses from pulse generator in channel *b* which is identical to the generator just described. If the two signals are out of phase, a pulse is applied at line 42 of pulse generator **26*b* to reset its flip-flop Q21. The line 42 is not used in the pulse generator 26*a***.

The unipolar pulse train appearing at the output of Q20, and the bipolar pulse train from the secondary of the transformer T1 normally pass through pads before leaving the unit. For example, the output of T1 is coupled by C9 and R33 to the T pad formed by resistors R32, R26 and R27, and then by capacitor C8 to the odd output harmonic buss 43. The pulse train from Q2O via impedance matching emitter-follower Q24 passes through a similar pad circuitry, namely, resistors R40, R42 and R54 and then by capacitor C21 to the even harmonic buss 44.

If either unit in the redundant system fails, the external phase comparator 28 provides control voltages to change the attenuation in the pad in the working unit and terminates the failed unit. For example, failure of pulse generator **26*b* produces an alarm condition input at 46, FIG. 3A, in generator 26*a* and a mute signal to input 47, FIG. 3B. The input 46 causes Q25 to conduct biasing Q26 off. This removes ground from R26 of the T pad so that the pad no longer appears in the signal path. The signal applied to 47 turns on Q27 which causes Q28 to conduct. Q28 then connects the junction of R32, R33 to ground through C15 and C10 terminating the signal path. Therefore, the level on the odd harmonic buss will be the same as when both units were operating. The pad control and muting inputs at 46 and 47 operate similar circuitry in the output path for the even harmonic buss. Thus, a signal applied to 46 causes Q29 to conduct biasing Q30 off. This removes ground from R54 of the T pad so that the pad no longer appears in the signal path. The input to 47** turns on Q31 which causes Q32 to conduct. Q32 then connects the junction of R37 and R40 to ground through C23 and C16 terminating the signal path. Therefore, the level on the even harmonic buss will be the same as when both units were operating.

For maintenance purposes as previously described, a manual lock can be initiated to either pulse generator in the redundant system by means of selector switch 39, FIG. 1, on the front panel. Turning the switch to *a* will feed a mute signal to pulse generator **26*b* and a pad control signal to pulse generator 26*a* in the same manner as if failure had occurred in pulse generator 26*b***. Conversely, turning the switch to *b* will mute **26*a* and remove the pad from 26*b*. The locking control signals for the manual switch are obtained from amplifiers Q33 and Q34 which invert the fail input from the phase comparator 28**. This feature prevents locking accidentally to a unit that has failed or been removed from the drawer.

PHASE COMPARATOR

Figure 4:
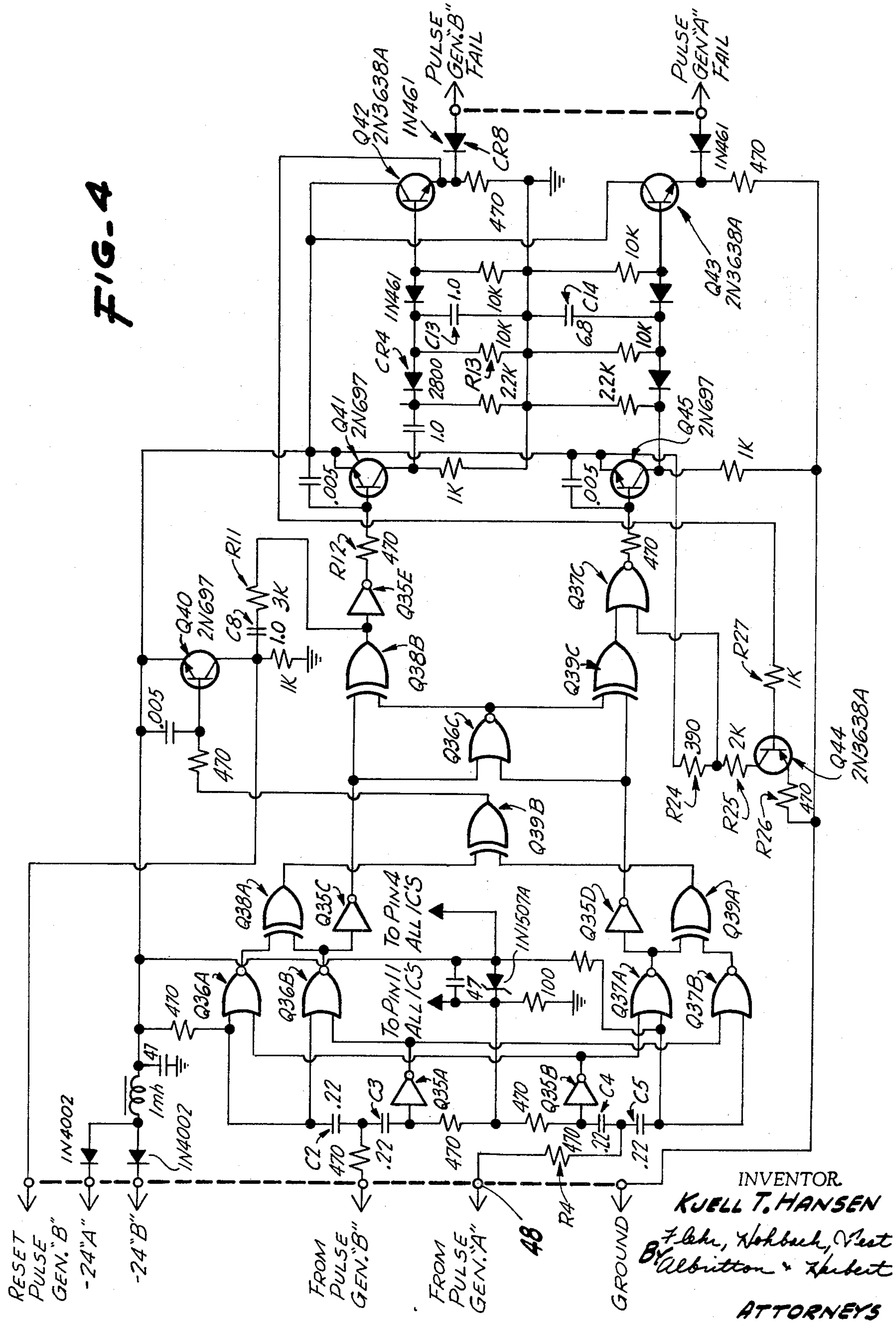
FIG. 4 is a detailed circuit diagram of the phase comparator of FIG. 1.

As previously described, the bipolar pulses appearing on the lines **27*a*, 27*b*, the output from the transformer T1, are applied to pulse phase comparator unit 28. A circuit diagram for a phase comparator unit is shown in FIG. 4. The bipolar pulses enter the unit at the terminal 48 and are applied to resistor R4 which is coupled to logic circuits through the capacitors C4 and C5. The logic gates Q37A and Q37B connected through C5 are normally held at logic "0", and only the positive going half of the bipolar input signal will override the steady state and present logic "1" pulses to the two gates. Similarly, the inverter Q35B connected through C4 is normally held at logic 1, and only the negative going half of the bipolar input signal will affect the inverter in the form of logic 0 pulses. Similarly, two more logic inputs are obtained through C2 and C3 from the pulse generator 26**b.

The negative pulse inputs are inverted by Q35A and Q35B, respectively. The output of Q35A goes to NOR gates Q36B and Q37B and the output of Q35B goes to NOR gates Q36A and Q37A. Also, Q36A and Q36B accept positive pulse inputs from pulse generator 26a, and Q37A and Q37B accept positive pulse inputs from generator 26b. Therefore, each of the four NOR gates compares a different combination of positive pulses and inverted negative pulses.

Each NOR gate produces a high output when both its inputs are low and a low output at all other times. If the pulse generators are synchronized and both operating normally, the resultant pulse train output from all four NOR gates will be identical. Exclusive OR gates Q38A, Q39A and Q39B are used to determine whether or not the pulse generators are synchronized. Each gate produces a low output at times when its inputs are identical, either low or high. With normally identical pulse train inputs, Q38A and Q39A produce constant low outputs to Q39B. Therefore, Q39B's output is also low and Q40 is biased off. If pulse generators are not synchronized, Q39B transmits pulses which normally turn on Q40 producing a negative voltage reset pulse output to the flip-flop circuit of pulse generator **26*b*. The negative reset pulses are also applied through inverter Q35E to bias on Q41. The output of Q41 is rectified by CR4 and charges the RC circuit including C13 and R13. When the voltage across capacitor C13 reaches a predetermined value, it drives emitter-follower Q42 to produce a control signal which mutes pulse generator 27*b* and removes pads from pulse generator 27*a***.

To verify that both pulse generators are operating, the pulse trains from Q36B and Q37A are applied to a network consisting of inverters Q35C and Q35D, NOR gate Q36C and exclusive OR gates Q38B and Q39C. If the signals from Q36B and Q37A are normal (identical), then the outputs of Q38B and Q39C will both be high. The high normal output from Q38B is inverted by Q35E and applied through R12 to bias Q41 off. If generator **27*b* fails, the output from Q38B will be a series of pulses which, after inversion by Q35E, causes Q41 to conduct. CR4 rectifies the output of Q41 and the resultant d.c. signal drives emitter-follower Q42. Q42's output through CR8 to line 33 is a control voltage which mutes pulse generator 27*b* and removes pads from the output of pulse generator 27*a*. Similarly, if pulse generator 26*a* fails, a control voltage output at line 31** is derived from the pulse train output of Q39C.

Because the pulse generators contain flip-flops with two possible starting states, an out-of-phase condition is likely to occur when the system is started up or recovers from a failure. A single reset pulse will reset pulse generator **27*b* in phase with the pulse generator 26*a*. Trouble conditions might occur in either plug-in units that would cause the pulse generator to be out-of-phase 180°. If this happens or if pulse generator 27*b*** will not reset for other reasons, the logic outputs will generate a train of reset pulses, and, as described above, a control signal after a predetermined time.

If the phase difference is not 180°, the logic outputs may attempt to mute both pulse generators at the same time. Protection circuits then function to cause muting of **27*b* and prevent pulse generator 26*a* from muting. Reset pulses from Q40 are coupled through C8 and R11 to the input of Q35E. A train of reset pulses will produce a d.c. control voltage from Q42 in the same manner as that produced by the pulse train from Q38B in the logic circuit. If the pulse trains are present at the same time at the input of Q38B, either reset or logic circuit pulses and at the output of Q39C, Q42 will produce a control voltage output at line 31** before Q43 begins to conduct. This is because C13 which establishes the time constant for Q42 is a smaller capacitor than C14 in the input circuit to Q43. The output of Q42 is also connected through R27 to the base of Q44. Normally, the NOR gate Q37C functions as an inverter because of the low input through R24. This input becomes high due to current flow through R25, R26 when Q44 is biased on by voltage from Q42. The high input inhibits Q37C from producing high output pulses to drive Q45. Therefore, d.c. control outputs cannot exist at lines 31 and 33 at the same time.

REDUCTION TO PRACTICE

A carrier supply was constructed in accordance with the circuits shown in the Figures and using the component values set forth. The system provided 124 KHz basic supergroup carrier, 420 KHz regulating carrier and 612 KHz carrier for a low supergroup, all synchronized to an external 64 KHz pilot signal.

CONCLUSION

Thus, there is provided a carrier supply having synchronized parallel redundant channels applicable to voice communication and high speed data communication. The synchronous redundancy configuration virtually eliminates the phase and amplitude interruptions often encountered with carrier supplies employing standby and transfer methods.

I claim:

1. A carrier frequency supply including first and second channels each having input and output terminals, wherein each of said channels comprises a pulse generator connected to the input terminal to receive input signals of predetermined frequency and generate output pulses at a related frequency, a voltage controlled attenuation means connected to receive the output of said pulse generator and supplying pulses to the output terminals, means for linearly combining the output pulses from each of said channels, and comparator means connected between said first and second channels to receive signals from each of the pulse generators and providing an output control voltage when one of said channels fails and applying said voltage to the attenuation means in each channel whereby to mute the output of the one channel and increase the output of the other channel to maintain the output of said combiner at substantially constant amplitude.

2. A carrier frequency supply as in claim 1 wherein said comparator means includes means for comparing the phase of the output of the pulse generators of said first and second channels and deriving a reset signal when the two channels are out of phase, and means in said second pulse generator for receiving said reset signal to reset the generator so that it is in phase with the first pulse generator.

3. A carrier frequency supply as in claim 1 wherein said attenuating means comprise attenuators and switching means responsive to the control voltage for selectively switching said attenuators.

4. A carrier frequency supply as in claim 1 wherein said pulse generators serve to provide pulses having high even and high odd harmonic content and independent attenuator means are connected to receive the even and odd harmonic content pulses.

5. A carrier frequency supply as in claim 2 including means for receiving said reset signal and control the attenuation means to increase the output of the first channel and decrease the output of the second channel.

6. In a carrier frequency supply including first and second channels, redundant signal frequency supply means comprising first and second voltage controlled oscillators, first and second frequency dividers connected to receive the output of said first and second oscillators respectively and provide a lower frequency output, means responsive to an output from the first frequency divider and an input reference frequency serving to generate a control voltage and apply the same to said first oscillator, and means responsive to an output from the first frequency divider and an output from the second frequency divider and generate a control voltage and supply the same to the second oscillator whereby the frequencies of the first and second oscillators are synchronized to one another and to the input reference frequency.

7. A carrier frequency supply as in claim 6 including switch means responsive to failure of the first channel to inhibit application of signals from the first divider to the second phase comparator and applying thereto said reference frequency whereby the second oscillator is then controlled by the reference frequency.

8. An oscillator system as in claim 7 including a phase comparison means connected to receive the output of said first and second frequency dividers and serving to generate a signal for resetting the second divider in the event the outputs of the two dividers are out-of-phase.

9. A carrier frequency supply including first and second channels, redundant signal frequency supply means comprising first and second voltage controlled oscillators, first and second frequency dividers connected to receive the output of said first and second oscillators respectively and provide a lower frequency output, means responsive to an output from the first frequency divider and an input reference frequency serving to generate a control voltage and apply the same to said first oscillator, means responsive to an output from the first frequency divider and an output from the second frequency divider and generate a control voltage and apply the same to the second oscillator whereby the frequencies of the first and second oscillators are synchronized to one another and to the input reference frequency, first and second pulse generators connected to receive the output from each of said dividers and generate output pulses at a related frequency, first and second voltage controlled attenuation means connected to receive the output of said pulse generators and supply pulses to the output terminals, means for linearly combining the output pulses from each of said channels, and comparator means connected between said first and second channels to receive signals from said pulse generators and providing an output control voltage when one of said channels fails and applying said voltage to the attenuation means in each channel whereby to mute the output of the failed channel and increase the output of the operative channel to maintain the output at substantially constant amplitude.

10. A carrier frequency supply as in claim 9 wherein said comparator means includes means for comparing the phase of the output of the pulse generators of said first and second channels and deriving a reset signal when the two channels are out-of-phase, and means in said second pulse generator for receiving said reset signal to reset the generator so that it is in phase with the first pulse generator.

11. A carrier frequency supply as in claim 9 wherein said attenuating means comprise attenuators and switching means responsive to the control voltage for selectively switching said attenuators.

12. A carrier frequency supply as in claim 9 including switch means responsive to failure of the first channel to inhibit application of signals from the first divider to the second phase comparator and applying thereto said reference frequency whereby the second oscillator is then controlled by the reference frequency.

13. An oscillator system as in claim 12 including a phase comparison means connected to receive the output of said first and second frequency dividers and serving to generate a signal for resetting the second divider in the event the outputs of the two dividers are out-of-phase.

14. A carrier frequency supply as in claim 10 including means for receiving said reset signal and control the attenuation means to increase the output of the first channel and decrease the output of the second channel.

* * * * *